US012184160B2

(12) United States Patent
Qin et al.

(10) Patent No.: US 12,184,160 B2
(45) Date of Patent: Dec. 31, 2024

(54) COMMON-MODE VOLTAGE SUPPRESSION METHOD AND SYSTEM FOR QUASI-Z-SOURCE SIMPLIFIED THREE-LEVEL INVERTER

(71) Applicant: SHANDONG JIANZHU UNIVERSITY, Shandong (CN)

(72) Inventors: Changwei Qin, Jinan (CN); Xiaoyan Li, Jinan (CN); Zhiyuan Chu, Jinan (CN); Hongliang Zhang, Jinan (CN); Yanfeng Li, Jinan (CN)

(73) Assignee: SHANDONG JIANZHU UNIVERSITY, Jinan (CN)

( * ) Notice: Subject to any disclaimer, the term of this patent is extended or adjusted under 35 U.S.C. 154(b) by 0 days.

(21) Appl. No.: 18/280,336

(22) PCT Filed: Dec. 28, 2022

(86) PCT No.: PCT/CN2022/142870
§ 371 (c)(1),
(2) Date: Sep. 5, 2023

(87) PCT Pub. No.: WO2024/060457
PCT Pub. Date: Mar. 28, 2024

(65) Prior Publication Data
US 2024/0348152 A1 Oct. 17, 2024

(30) Foreign Application Priority Data
Sep. 19, 2022 (CN) .......................... 202211135853.7

(51) Int. Cl.
H02M 1/088 (2006.01)
H02M 1/12 (2006.01)
(Continued)

(52) U.S. Cl.
CPC ........... *H02M 1/123* (2021.05); *H02M 1/088* (2013.01); *H02M 7/487* (2013.01); *H02M 7/5395* (2013.01)

(58) Field of Classification Search
CPC ...... H02M 1/123; H02M 1/088; H02M 7/487; H02M 7/5395
See application file for complete search history.

(56) References Cited

U.S. PATENT DOCUMENTS 11,296,593 B2 * 4/2022 Zhang .................. H02M 7/487
12,119,771 B2 * 10/2024 Abarzadeh .......... H02M 1/0095

FOREIGN PATENT DOCUMENTS

| CN | 109217701 A | 1/2019 |
| CN | 113783453 A | 12/2021 |
| CN | 115459568 A | 12/2022 |

OTHER PUBLICATIONS

Apr. 13, 2023 International Search Report issued in International Patent Application No. PCT/CN2022/142870.
(Continued)

*Primary Examiner* — Adolf D Berhane
(74) *Attorney, Agent, or Firm* — Oliff PLC

(57) ABSTRACT

A common-mode voltage suppression method includes: selecting two large and two small vectors with low common-mode voltage magnitudes as basic voltage vectors; writing a volt-second balance equation according to a selected basic voltage vectors, and calculating, an introduced distribution factor of duty cycles of small vectors, initial values of distribution factors of a duty cycle of each basic voltage vector and of small vectors; designing a neutral-point voltage balance controller to obtain and utilize a corrected value of the distribution factor of the duty cycles of the small vectors and the initial values and combine with a set neutral-point voltage balance control threshold to update the duty cycle of each basic voltage vector; and inserting
(Continued)

shoot-through states into the small vectors, designing a switching sequence, converting the sequence into a driving signal of a power switch, and controlling an operation of the quasi-Z-source simplified three-level inverter.

8 Claims, 5 Drawing Sheets

(51) Int. Cl.
*H02M 7/487* (2007.01)
*H02M 7/5395* (2006.01)

(56) References Cited

OTHER PUBLICATIONS

Apr. 13, 2023 Written Opinion issued in International Patent Application No. PCT/CN2022/142870.

* cited by examiner

COMMON-MODE VOLTAGE SUPPRESSION METHOD AND SYSTEM FOR QUASI-Z-SOURCE SIMPLIFIED THREE-LEVEL INVERTER

The present invention claims the priority of a Chinese patent application with an application number 202211135853.7 submitted to the Chinese Patent Office on Sep. 19, 2022, and titled "Common-mode voltage suppression method and system for quasi-Z-source simplified three-level inverter", the entire contents of which is incorporated in the present invention by reference.

FIELD OF TECHNOLOGY

The present invention belongs to the technical field of power electronic power conversion, and in particular relates to a common-mode voltage suppression method and system for a quasi-Z-source simplified three-level inverter.

BACKGROUND TECHNOLOGY

The statements in this part only provide background technical information related to the present invention and do not necessarily constitute the prior art.

A quasi-Z-source three-level inverter has advantages of single-stage power conversion, continuous input current, small capacity of a passive device, no need to set dead-time, etc., and has been widely used in solar photovoltaic power generation, energy storage system, motor drive and other fields. A quasi-Z-source Neutral Point Clamped (NPC) and T-Type three-level inverters are the two most commonly used quasi-Z-source three-level inverter topologies, but they need to use a large number of power switches, which inevitably increases a system cost and volume.

In order to further reduce the number of power switches and reduce the system volume and cost, a quasi-Z-source network can be combined with a simplified three-level inverter to form a quasi-Z-source simplified three-level inverter, which comprises ten power switches, and the count is further reduced compared with the traditional quasi-Z-source three-level inverter topology, and it does not need to use a clamped diode, while maintaining advantages of a multi-level output, which has a broad application prospect.

The inventor has found that an existing modulation method for the quasi-Z-source simplified three-level inverter uses all the basic voltage vectors to synthesize a reference voltage vector, resulting in a high magnitude of an output Common-Mode Voltage (CMV) of the system, which leads to many drawbacks such as a common-mode current and electromagnetic interference, seriously affecting a normal operation of the system. Therefore, it is urgent to study a common-mode voltage suppression method suitable for the quasi-Z-source simplified three-level inverter.

SUMMARY OF THE INVENTION

In order to solve the technical problems existing in the prior art, the present invention provides a common-mode voltage suppression method and system of a quasi-Z-source simplified three-level inverter. The present invention can effectively suppress a common-mode voltage of a quasi-Z-source simplified three-level inverter system, realize a voltage boosting function of the system, and ensure a neutral-point voltage balance.

In order to realize the above purposes, the present invention adopts the following technical solution:

In a first aspect of the present invention, it provides a common-mode voltage suppression method for a quasi-Z-source simplified three-level inverter.

A common-mode voltage suppression method for a quasi-Z-source simplified three-level inverter, comprising:
  judging a sector where a reference voltage vector is located according to a magnitude and a phase angle of the reference voltage vector;
  selecting two large vectors and two small vectors with low common-mode voltage magnitudes as basic voltage vectors according to the sector where the reference voltage vector is located;
  writing a volt-second balance equation according to the selected basic voltage vectors, and calculating, in combination with an introduced distribution factor of duty cycles of small vectors, initial values of distribution factors of a duty cycle of each basic voltage vector and duty cycles of small vectors;
  designing a neutral-point voltage balance controller so as to obtain a corrected value of the distribution factor of the duty cycles of the small vectors; and
  utilizing the corrected value of the distribution factor of the duty cycles of the small vectors and the initial values and combining with a set neutral-point voltage balance control threshold to update the distribution factor of duty cycles of the small vectors so as to update the duty cycle of each basic voltage vector; and
  inserting shoot-through states into the small vectors, designing a corresponding switching sequence, converting the switching sequence into a driving signal of a power switch, and controlling an operation of the quasi-Z-source simplified three-level inverter.

In a second aspect of the present invention, it provides a common-mode voltage suppression system for a quasi-Z-source simplified three-level inverter.

A common-mode voltage suppression system for a quasi-Z-source simplified three-level inverter, comprising:
  a sector judgment module configured to judge a sector where a reference voltage vector is located according to a magnitude and a phase angle of the reference voltage vector;
  a basic voltage vector selecting module configured to select two large vectors and two small vectors with low common-mode voltage magnitudes as basic voltage vectors according to the sector where the reference voltage vector is located;
  a basic voltage vector duty cycle and small vector duty cycle distribution factor calculation module configured to write a volt-second balance equation according to the selected basic voltage vectors, and calculate, in combination with an introduced distribution factor of duty cycles of small vectors, initial values of distribution factors of a duty cycle of each basic voltage vector and duty cycles of small vectors;
  a neutral-point voltage balance controller module configured to design a neutral-point voltage balance controller so as to obtain a corrected value of the distribution factor of the duty cycles of the small vectors; and
  a small vector duty cycle distribution factor update module configured to utilize the corrected value of the distribution factor of the duty cycles of the small vectors and the initial values and combine with a set neutral-point voltage balance control threshold to update the distribution factor of duty cycles of the small vectors so as to update the duty cycle of each basic voltage vector; and a shoot-through state insertion and switching sequence design module configured to insert shoot-through states into the small vectors, design a corresponding switching sequence, convert the switching sequence into a driving signal of a power switch, and control an operation of the quasi-Z-source simplified three-level inverter.

In a third aspect of the present invention, it provides a computer-readable storage medium.

A computer-readable storage medium on which a computer program is stored that, when executed by a processor, implements the steps in the common-mode voltage suppression method of the quasi-Z-source simplified three-level inverter as described in the first aspect above.

In a fourth aspect of the present invention, it provides a computer device.

A computer device comprising a memory, a processor and a computer program stored in the memory and is capable of being run on the processor, wherein the processor executes the program to implement the steps in the common-mode voltage suppression method of the quasi-Z-source simplified three-level inverter as described in the first aspect above.

Compared with the prior art, the beneficial effects of the present invention are as follows:
1. The present invention can limit the common-mode voltage of the quasi-Z-source simplified three-level inverter system to be within $+V_{dc}/6$, which is ½ lower than the traditional space vector modulation method.
2. The present invention inserts the down-shoot-through state into the P-type small vectors and the up-shoot-through state into the N-type small vectors to realize the voltage boosting function of the system without affecting the normal output AC voltage of the system.
3. The present invention updates the distribution factor of small vectors according to the sector where the reference voltage vector is located and the capacitor voltage deviation value on the DC side, and effectively controls the neutral-point voltage balance, while the capacitor voltage fluctuation magnitude is small.
4. When the neutral-point voltage offset is caused by an abnormal factor, the present invention has the ability to restore the neutral-point voltage balance, thus improving the operating reliability of the system.

The advantages of additional aspects of the present invention are partly given in the description below, and are partly apparent from the description below, or are understood through the practice of the present invention.

BRIEF DESCRIPTION OF THE DRAWINGS

The drawings forming part of the invention are used to provide further understanding of the present invention, and schematic embodiments of the present invention and their descriptions are used to interpret the present invention and do not constitute undue limitation to the present invention.

DESCRIPTION OF THE EMBODIMENTS

Figure 1:
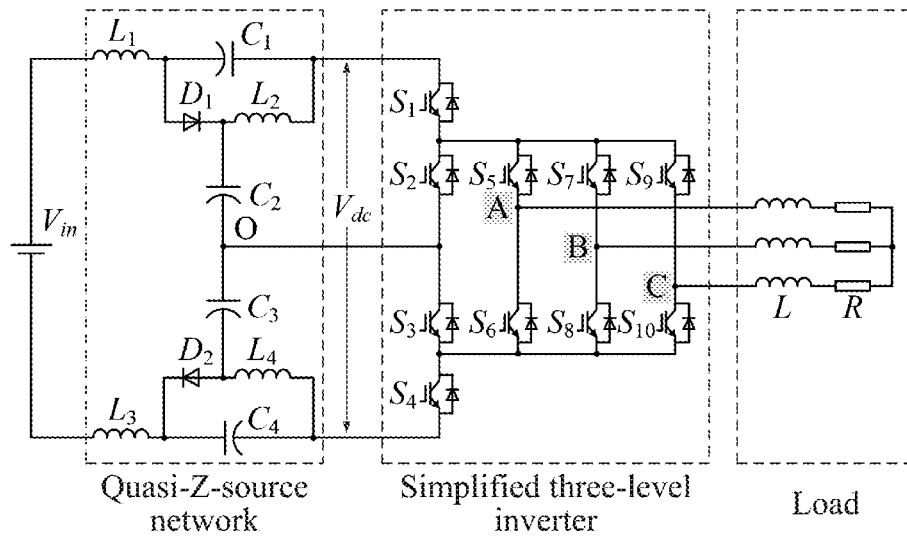
FIG. 1 is a circuit topology diagram of a quasi-Z-source simplified three-level inverter.

The present invention is further explained in combination with the drawings and embodiments below.

It should be noted that the following detailed explanations are illustrative and are intended to provide further explanations of the present invention. Unless otherwise indicated, all technical and scientific terms used herein have the same meaning as would normally be understood by an ordinary skilled person in the technical field to which the present invention belongs.

It should be noted that the terms used herein are intended only to describe specific implementations and are not intended to limit exemplary implementations under the present invention. As used herein, a singular form is also intended to include the plural form unless the context otherwise explicitly indicates, and it should also be understood that when terms "include" and/or "comprise" are used in this specification, they indicate the presence of features, steps, operations, devices, components and/or combinations thereof.

It should be noted that flowcharts and block diagrams in the drawings show possible implementations of an architecture, functions, and operations of the methods and systems according to various embodiments of the present invention. It should be noted that each block in the flowcharts or block diagrams may represent a module, a program segment, or part of codes that may include one or more executable instructions for implementing a logical function specified in each embodiment. It should also be noted that in some alternative implementations, the functions indicated in the blocks can occur in a different order than those indicated in the drawing. For example, two blocks that are represented consecutively can actually be executed basically in parallel, or they can sometimes be executed in a reverse order, depending on functions involved. It should also be noted that each block in the flowcharts and/or block diagrams, and a combination of the blocks in the flowcharts and/or block diagrams, may be implemented using a dedicated hardware-based system that performs a specified function or operation, or may be implemented using a combination of a dedicated hardware and computer instructions.

First Embodiment

This embodiment provides a common-mode voltage suppression method for a quasi-Z-source simplified three-level inverter.

A common-mode voltage suppression method for a quasi-Z-source simplified three-level inverter, comprising:
judging a sector where a reference voltage vector is located according to a magnitude and a phase angle of the reference voltage vector;
selecting two large vectors and two small vectors with low common-mode voltage magnitudes as basic voltage vectors according to the sector where the reference voltage vector is located;
writing a volt-second balance equation according to the selected basic voltage vectors, and calculating, in combination with an introduced distribution factor of duty cycles of small vectors, initial values of distribution factors of a duty cycle of each basic voltage vector and duty cycles of small vectors;
designing a neutral-point voltage balance controller so as to obtain a corrected value of the distribution factor of the duty cycles of the small vectors; and
utilizing the corrected value of the distribution factor of the duty cycles of the small vectors and the initial values and combining with a set neutral-point voltage balance control threshold to update the distribution factor of duty cycles of the small vectors so as to update the duty cycle of each basic voltage vector; and
inserting shoot-through states into the small vectors, designing a corresponding switching sequence, converting the switching sequence into a driving signal of a power switch, and controlling an operation of the quasi-Z-source simplified three-level inverter.

FIG. 1 is a circuit topology diagram of a quasi-Z-source simplified three-level inverter, which comprises the following components: a DC power supply, a quasi-Z-source network, a simplified three-level inverter and a load. The quasi-Z-source network is connected between the DC power supply and the simplified three-level inverter and is used to realize a voltage boosting function. An input voltage is $V_{in}$ and an output voltage is $V_{dc}$. The simplified three-level inverter consists of 10 power switches ($S_1$, $S_2$, ..., $S_{10}$). Pulse Width Modulation (PWM) is used to control on and off of each power switch. It can be understood that the power switches are Insulate-Gate Bipolar Transistors (IGBTs), but the power switches can also be implemented using other forms of transistors.

In the quasi-Z-source simplified three-level inverter system, inherent high frequency switching characteristics of power devices produce a Common-Mode Voltage (CMV), which leads to many drawbacks such as a common-mode current and electromagnetic interference, seriously affecting a normal operation of the system. Therefore, common-mode voltage suppression has become a key problem to be solved urgently.

The common-mode voltage is defined as an arithmetic average of three-phase output phase voltages of the system, i.e., $$v_{cm} = \frac{1}{3} \cdot (v_{ao} + v_{bo} + v_{co}) \quad (1)$$

$v_{ao}$, $v_{bo}$ and $v_{co}$ are the three-phase output phase voltages of the quasi-Z-source simplified three-level inverter.

Switching states of the quasi-Z-source simplified three-level inverter can be divided into two types: a Non-Shoot-Through state and a Shoot-Through state. The same as an ordinary simplified three-level inverter, the quasi-Z-source simplified three-level inverter has three non-shoot-through states: [P], [O] and [N]. A neutral point of the quasi-Z-source network (i.e., point $O_1$ in FIG. 1) is selected as a reference point. When the switching state is [P], an output voltage of a bridge arm is $+V_{dc}/2$. When the switching state is [O], the output voltage of the bridge arm is 0. When the switching state is [N], the output voltage of the bridge arm is $-V_{dc}/2$. The shoot-through states of the quasi-Z-source simplified three-level inverter comprise three types: an Up-Shoot-Through (UST) state (abbreviated as [U]), a Down-Shoot-Through (DST) state (abbreviated as [D]), and a Full-Shoot-Through (FST) state (abbreviated as [F]).

TABLE 1

Basic voltage vectors selected by the method of the present invention and corresponding switching states

| Voltage vectors | Switching states | On switches | Switching states | On switches |
| --- | --- | --- | --- | --- |
| Large vectors | [PNN] | {1, 4, 5, 8, 10} | [PPN] | {1, 4, 5, 7, 10} |
| | [NPN] | {1, 4, 6, 7, 10} | [NPP] | {1, 4, 6, 7, 9} |
| | [NNP] | {1, 4, 6, 8, 9} | [PNP] | {1, 4, 5, 8, 9} |
| Small vectors | [POO] | {1, 3, 5, 8, 10} | [OON] | {2, 4, 5, 7, 10} |
| | [OPO] | {1, 3, 6, 7, 10} | [NOO] | {2, 4, 6, 7, 9} |
| | [OOP] | {1, 3, 6, 8, 9} | [ONO] | {2, 4, 5, 8, 9} |
| Zero vectors | [OOO]-1 | {2, 3, 5, 7, 10} | [OOO]-2 | {2, 3, 5, 8, 10} |
| | [OOO]-3 | {2, 3, 6, 7, 9} | [OOO]-4 | {2, 3, 6, 7, 10} |
| | [OOO]-5 | {2, 3, 5, 8, 9} | [OOO]-6 | {2, 3, 6, 8, 9} |
| Shoot-through vectors | [PDD] | {1, 3, 4, 5, 8, 10} | [UUN] | {1, 2, 4, 5, 7, 10} |
| | [DPD] | {1, 3, 4, 6, 7, 10} | [NUU] | {1, 2, 4, 6, 7, 9} |
| | [DDP] | {1, 3, 4, 6, 8, 9} | [UNU] | {1, 2, 4, 5, 8, 9} |

Figure 2:
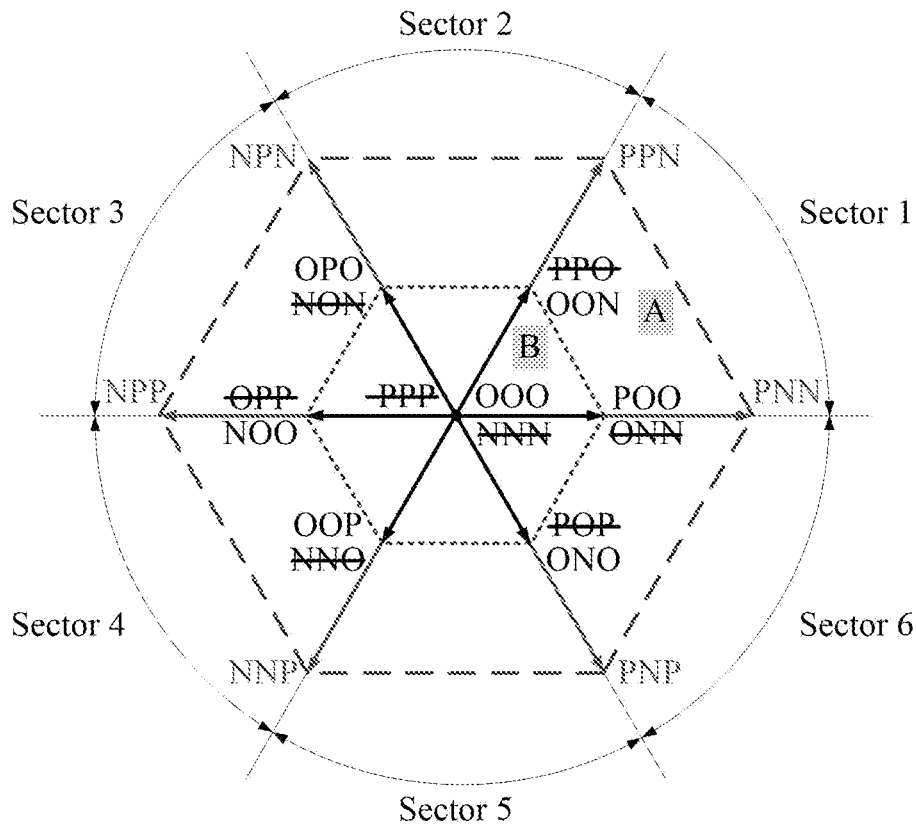
FIG. 2 is a space vector diagram of a common-mode voltage suppression method of the quasi-Z-source simplified three-level inverter of the present invention.

FIG. 2 is a space vector diagram of a common-mode voltage suppression method of the quasi-Z-source simplified three-level inverter of the present invention. The basic voltage vectors selected by the method of the present invention, the corresponding switching states and switches being on are shown in Table 1. It can be seen that the method of the present invention selects the basic voltage vectors of low common-mode voltage magnitudes (including six large vectors, six small vectors of low common-mode voltage magnitudes, one zero vector of low common-mode voltage magnitude, and six shoot-through vectors). The selected six small vectors to contain only at most one P state or one N state to suppress the common-mode voltage of the system.

Figure 3:
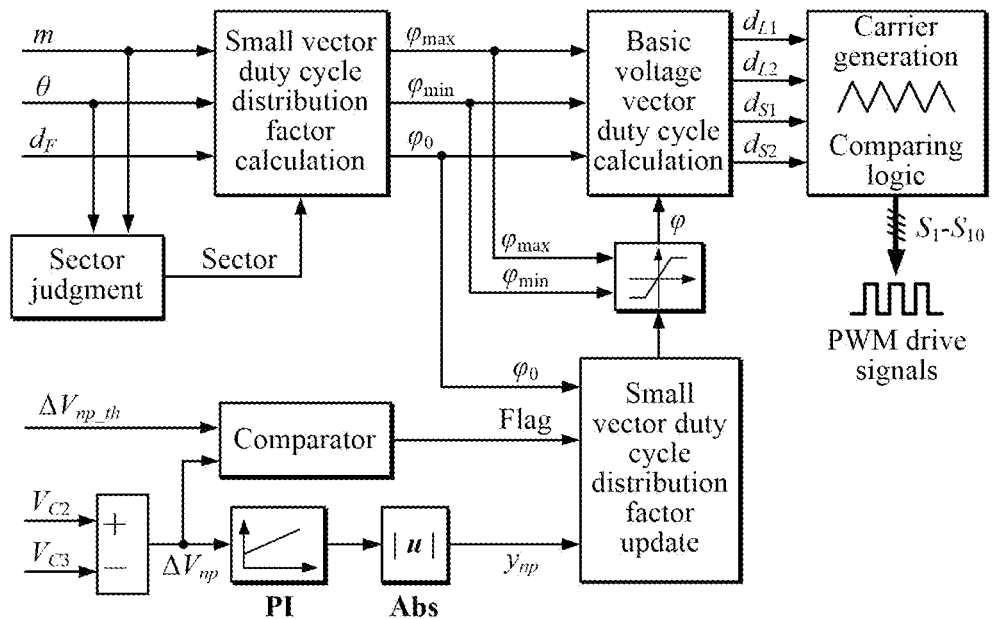
FIG. 3 is a control block diagram of the common-mode voltage suppression method of the quasi-Z-source simplified three-level inverter of the present invention.

FIG. 3 is a control block diagram of the common-mode voltage suppression method of the quasi-Z-source simplified three-level inverter of the present invention. In order to achieve the common-mode voltage suppression, the neutral-point voltage balance control and the voltage boosting, a control strategy is designed, which comprises the following steps:

1. Judging a Sector where a Reference Voltage Vector is Located

The sector where the reference voltage vector is located is judged according to a magnitude and a phase angle of the reference voltage vector.

2. Selecting Basic Voltage Vectors and Calculating a Distribution Factor of the Duty Cycles of the Small Vectors Without loss of generality, sector 1 is taken as an example to explain a selection of the basic voltage vectors and a calculation method of the duty cycles. When the reference voltage vector is located in sector 1, a large vector $V_{L1}$ [PNN], a large vector $V_{L2}$[PPN], a small vector $V_{S1}$[POO] and a small vector $V_{S2}$[OON] are selected to synthesize the reference voltage vector. According to a volt-second balance principle, it can be obtained:

$$\begin{cases} V_{L1} \cdot d_{L1} + V_{L2} \cdot d_{L2} + V_{S1} \cdot d_{S1} + V_{S2} \cdot d_{S2} = V_{ref} \\ d_{L1} + d_{L2} + d_{S1} + d_{S2} = 1 \end{cases} \quad (2)$$

$d_{L1}$, $d_{L2}$, $d_{S1}$ and $d_{S2}$ respectively represent the duty cycles of large vector [PNN], large vector [PPN], small vector [POO] and small vector [OON], and V'ref is the reference voltage vector.

Because four basic voltage vectors are used to synthesize the reference voltage vector, an indirect calculation method is designed to solve the duty cycles of basic voltage vectors. Expressions of the large vector $V_{L1}$[PNN], large vector $V_{L2}$[PPN], small vector $V_{S1}$[POO] and small vector $V_{S2}$ [OON] are respectively $$\begin{cases} V_{L1}[PNN] = \frac{2V_{dc}}{3} \\ V_{L2}[PPN] = \frac{2V_{dc}}{3} e^{j\frac{\pi}{3}} \\ V_{S1}[POO] = \frac{V_{dc}}{3} \\ V_{S2}[OON] = \frac{V_{dc}}{3} e^{j\frac{\pi}{3}} \end{cases} \quad (3)$$

The expression of each basic voltage vector is substituted to the volt-second balance equation and the volt-second balance equation is simplified, and a sum of duty cycles of the two small vectors satisfies:

$$d_{S1} + d_{S2} = 2 - 2m \cdot \sin\left(\frac{\pi}{3} + \theta\right) \quad (4)$$

wherein m and θ are a degree of modulation and a phase angle of the reference voltage vector, respectively.

By introducing the distribution factor φ of the duty cycles of the small vectors (0<φ<1), $d_{S1}$ and $d_{S2}$ are respectively expressed as:

$$\begin{cases} d_{S1} = \varphi \cdot \left[2 - 2m \cdot \sin\left(\frac{\pi}{3} + \theta\right)\right] \\ d_{S2} = (1 - \varphi) \cdot \left[2 - 2m \cdot \sin\left(\frac{\pi}{3} + \theta\right)\right] \end{cases} \quad (5)$$

In order to ensure a normal voltage boosting function of the system, it is necessary to limit a size of the distribution factor φ of the duty cycles of the small vectors, that is:

$$\begin{cases} d_{S1} = \varphi \cdot \left[2 - 2m \cdot \sin\left(\frac{\pi}{3} + \theta\right)\right] > d_{ST} \\ d_{S2} = (1 - \varphi) \cdot \left[2 - 2m \cdot \sin\left(\frac{\pi}{3} + \theta\right)\right] > d_{ST} \end{cases} \quad (6)$$

$d_{ST}$ indicates a shoot-through duty cycle.

By solving the above set of inequalities, it can be obtained that the distribution factor φ of the duty cycles of the small vectors needs to satisfy $$\begin{cases} \varphi > \frac{d_{ST}}{2 - 2m \cdot \sin\left(\frac{\pi}{3} + \theta\right)} \\ \varphi < 1 - \frac{d_{ST}}{2 - 2m \cdot \sin\left(\frac{\pi}{3} + \theta\right)} \end{cases} \quad (7)$$

By using the above distribution factor of the duty cycles of the small vectors, duty cycles of the two large vectors can be expressed as $$\begin{cases} d_{L1} = m \cdot \sin\left(\frac{\pi}{3} - \theta\right) - \varphi \cdot \left[1 - m \cdot \sin\left(\frac{\pi}{3} + \theta\right)\right] \\ d_{L2} = \sqrt{3} \cdot m \cdot \sin\left(\frac{\pi}{6} + \theta\right) + \varphi \cdot \left[1 - m \cdot \sin\left(\frac{\pi}{3} + \theta\right)\right] - 1 \end{cases} \quad (8)$$

Since the duty cycle of each basic voltage vector must be greater than 0 and less than 1, a value range of distribution factor φ of the duty cycles of the small vectors can be obtained as follows:

$$\begin{cases} \varphi < \frac{m \cdot \sin\left(\frac{\pi}{3} - \theta\right)}{1 - m \cdot \sin\left(\frac{\pi}{3} + \theta\right)} \\ \varphi > \frac{1 - \sqrt{3} \cdot m \cdot \sin\left(\frac{\pi}{6} + \theta\right)}{1 - m \cdot \sin\left(\frac{\pi}{3} + \theta\right)} \end{cases} \quad (9)$$

By considering a size limitation condition of the distribution factor φ of the duty cycles of the small vectors, minimum and maximum values thereof can be obtained as $$\varphi_{min} = \max\left\{0, \frac{d_{ST}}{2 - 2m \cdot \sin\left(\frac{\pi}{3} + \theta\right)}, \frac{1 - \sqrt{3} \cdot m \cdot \sin\left(\frac{\pi}{6} + \theta\right)}{1 - m \cdot \sin\left(\frac{\pi}{3} + \theta\right)}\right\} \quad (10)$$

$$\varphi_{max} = \min\left\{1, 1 - \frac{d_{ST}}{2 - 2m \cdot \sin\left(\frac{\pi}{3} + \theta\right)}, \frac{m \cdot \sin\left(\frac{\pi}{3} - \theta\right)}{1 - m \cdot \sin\left(\frac{\pi}{3} + \theta\right)}\right\} \quad (11)$$

According to an inequality scaling principle, it is not difficult to get $$\varphi_{min} = \frac{\varphi_{min} + \varphi_{min}}{2} < \frac{\varphi_{max} + \varphi_{min}}{2} < \frac{\varphi_{max} + \varphi_{max}}{2} = \varphi_{max} \quad (12)$$

Taking an initial value $\varphi_0$ of the distribution factor $\varphi$ of the duty cycles of the small vectors as an arithmetic mean value of a maximum value $\varphi_{max}$ and a minimum value $\varphi_{min}$, i.e., $$\varphi_0 = \frac{\varphi_{max} + \varphi_{min}}{2} \tag{13}$$

When the reference voltage vector is located in other sectors except sector 1, it is not difficult to obtain the duty cycles of the corresponding basic voltage vectors and the value of the duty cycle distribution factor of the small vectors by using a phase-to-angle mapping relationship between different sectors and symmetry of a space vector diagram, which is not repeated herein.

3. Designing a Neutral-Point Voltage Balance Controller

Voltages at both ends of capacitors $C_2$ and $C_3$ in a quasi-Z-source network are sampled to calculate a deviation of the voltages of the two capacitors and send the deviation to a PI regulator, and an absolute value of an output of the PI regulator is taken to calculate a corrected value $y_{np}$ of the distribution factor of the duty cycles of the small vectors, that is $$y_{np} = \left| \left( k_{p,np} + \frac{k_{i,np}}{s} \right) \cdot (V_{C2} - V_{C3}) \right| \tag{14}$$

$V_{C2}$ and $V_{C3}$ are the voltages at both ends of the capacitors $C_2$ and $C_3$ respectively, $k_{p,np}$ and $k_{i,np}$ are parameters of the PI regulator.

4. Updating the Distribution Factor of the Duty Cycles of the Small Vectors

According to requirements of the neutral-point voltage balance control of the system, a neutral-point voltage balance control threshold $\Delta V_{np\_th}$ is set. According to the voltage deviation of the sector where the reference voltage vector is located and the voltages of capacitor $C_2$ and $C_3$, the distribution factor of the duty cycles of the small vectors is updated by using the corrected value of the distribution factor of the duty cycles of the small vectors, of which specific rules are as follows:

(1) When $-\Delta V_{np\_th} < V_{C2} - V_{C3} < \Delta V_{np\_th}$, the distribution factor of duty cycles of small vectors is maintained unchanged at its initial value, i.e., $$\varphi = \varphi_0 \tag{15}$$

(2) When the reference voltage vector is located in sector 1, sector 3, or sector 5, and $V_{C2} - V_{C3} > \Delta V_{np\_th}$, the distribution factor of duty cycles of small vectors is updated as follows $$\varphi = \varphi_0 + y_{np} \tag{16}$$

(3) When the reference voltage vector is located in sector 1, sector 3, or sector 5, and $V_{C2} - V_{C3} < -\Delta V_{np\_th}$, the distribution factor of duty cycles of small vectors is updated as follows $$\varphi = \varphi_0 - y_{np} \tag{17}$$

(4) When the reference voltage vector is located in sector 2, sector 4, or sector 6, and $V_{C2} - V_{C3} > \Delta V_{np\_th}$, the distribution factor of duty cycles of small vectors is updated as follows $$\varphi = \varphi_0 - y_{np} \tag{18}$$

(5) When the reference voltage vector is located in sector 2, sector 4, or sector 6, and $V_{C2} - V_{C3} < -\Delta V_{np\_th}$, the distribution factor of duty cycles of small vectors is updated as follows $$\varphi = \varphi_0 + y_{np} \tag{19}$$

According to restriction conditions given by equations (10) and (11), the size of updated distribution factor of duty cycles of small vectors is further limited, and the duty cycle of each basic voltage vector can be further obtained.

5. Inserting Shoot-Through States and Designing a Switching Sequence

By considering factors such as low output harmonic contents and low switching loss, the switching sequence is designed. A down-shoot-through state is inserted into P-type small vectors and an up-shoot-through state is inserted into N-type small vectors to realize a voltage boosting function without affecting a normal output AC voltage of the system.

When the reference voltage vector is in sector 1, the switching sequence is designed as:
PNN-UUN-OON-PPN-PDD-POO-PDD-PPN-OON-UUN-PNN;

When the reference voltage vector is in sector 2, the switching sequence is designed as:
PPN-DPD-OPO-NPN-UUN-OON-UUN-NPN-OPO-DPD-PPN;

When the reference voltage vector is in sector 3, the switching sequence is designed as:
NPN-NUU-NOO-NPP-DPD-OPO-DPD-NPP-NOO-NUU-NPN;

When the reference voltage vector is in sector 4, the switching sequence is designed as:
NPP-DDP-OOP-NNP-NUU-NOO-NUU-NNP-OOP-DDP-NPP;

When the reference voltage vector is in sector 5, the switching sequence is designed as:
NNP-UNU-ONO-PNP-DDP-OOP-DDP-PNP-ONO-UNU-NNP;

When the reference voltage vector is in sector 6, the switching sequence is designed as:
PNP-PDD-POO-PNN-UNU-ONO-UNU-PNN-POO-PDD-PNP.

The switching sequence is converted into a driving signal of a power switch, so as to control an operation of the quasi-Z-source simplified three-level inverter system.

Figure 4A:
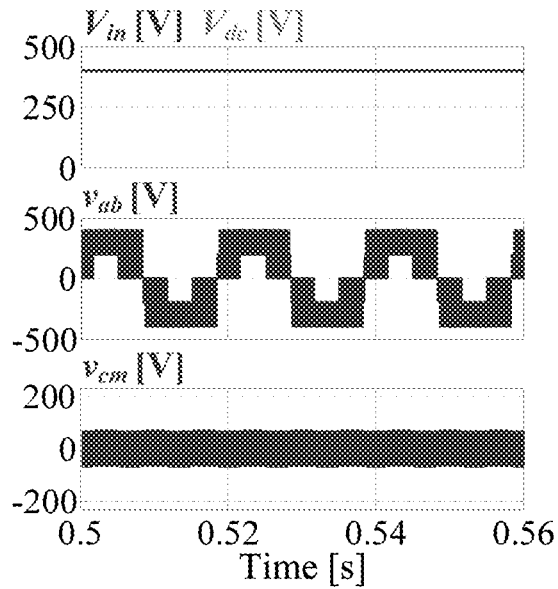
FIG. 4(a) and FIG. 4(b) are working waveform diagrams of a system under a non-boost operating mode using the method of the present invention, which include a DC input voltage ($V_{in}$), a quasi-Z-source network output voltage ($V_{dc}$), a line voltage ($v_{ab}$), a common-mode voltage ($v_{cm}$), three-phase output currents ($i_a$, $i_b$, $i_c$), and DC capacitor voltages ($V_{C1}$, $V_{C2}$, $V_{C3}$, $V_{C4}$).
Figure 4B:
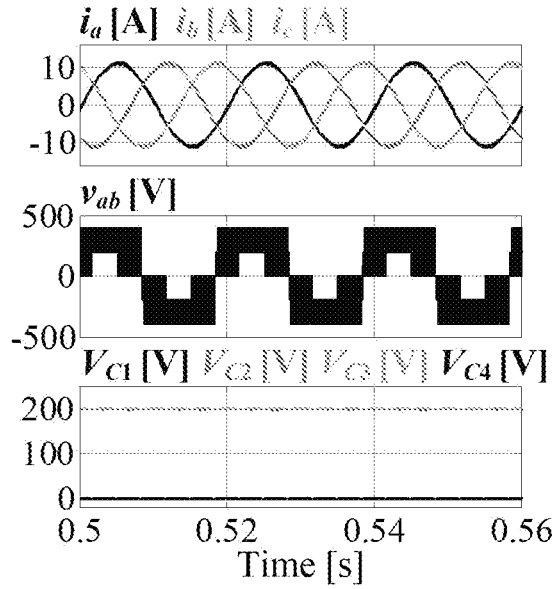

FIG. 4(a) and FIG. 4(b) are working waveform diagrams of a system under a non-voltage boosting operating mode using the method of the present invention, which include a DC input voltage ($V_{in}$), a quasi-Z-source network output voltage ($V_{dc}$), a line voltage ($v_{ab}$), a common-mode voltage ($v_{cm}$), three-phase output currents ($i_a$, $i_b$, $i_c$), and DC capacitor voltages ($V_{C1}$, $V_{C2}$, $V_{C3}$, $V_{C4}$). In this case, the DC input voltage is set to 400 V, and the degree of modulation and the shoot-through duty cycle are set to 0.8 and 0 respectively. It can be seen that the output voltage of the quasi-Z-source network is basically equal to the DC input voltage, the line voltage is a five-level waveform, and the output currents are three-phase symmetric sine waveforms; a magnitude of the common-mode voltage is only ⅙ of a magnitude of the output voltage of the quasi-Z-source network, that is, 67 V; and the voltages at both ends of the capacitors $C_2$ and $C_3$ are equal, that is, the method of the present invention can effectively control the neutral-point voltage balance.

Figure 5A:
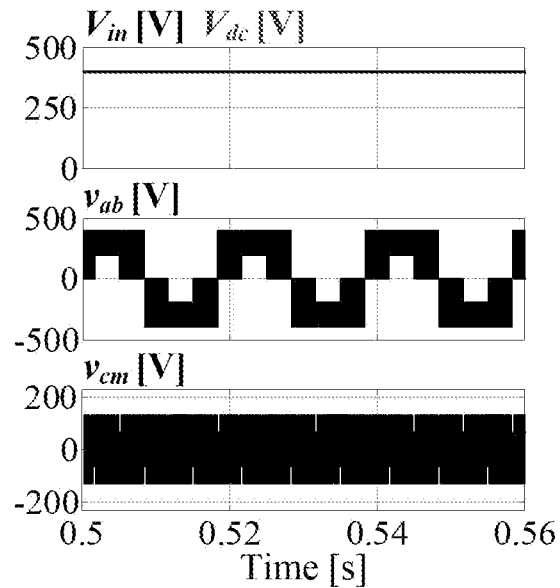
FIG. 5(a) and FIG. 5(b) are working waveform diagrams of the system under the non-boost operating mode using a traditional space vector modulation method, which include the DC input voltage ($V_{in}$), the quasi-Z-source network output voltage ($V_{dc}$), the line voltage ($v_{ab}$), the common-mode voltage ($v_{cm}$), the three-phase output currents ($i_a$, $i_b$, $i_c$), and the DC capacitor voltages ($V_{C1}$, $V_{C2}$, $V_{C3}$, $V_{C4}$).
Figure 5B:
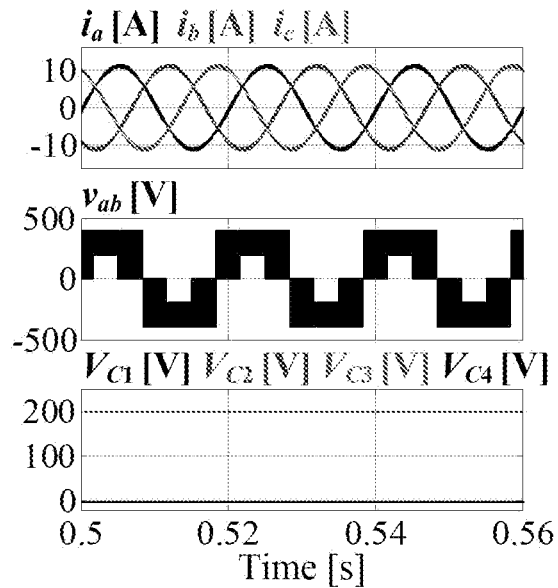

FIG. 5(a) and FIG. 5(b) are working waveform diagrams of the system under the non-voltage boosting operating mode using a traditional space vector modulation method, which include the DC input voltage ($V_{in}$), the quasi-Z-source network output voltage ($V_{dc}$), the line voltage ($v_{ab}$), the common-mode voltage ($v_{cm}$), the three-phase output currents ($i_a$, $i_b$, $i_c$), and the DC capacitor voltages ($V_{C1}$, $V_{C2}$, $V_{C3}$, $V_{C4}$). In this case, the DC input voltage is set to 400 V, and the degree of modulation and the shoot-through duty cycle are set to 0.8 and 0 respectively. The magnitude of the common-mode voltage of the system is equal to ⅓ of the magnitude of the output voltage of the quasi-Z-source network, that is, 133 V. By comparing FIG. 4(a) and FIG. 5(a), it can be seen that, compared with the traditional space vector modulation method, the method of the present invention can reduce the magnitude of the common-mode voltage of the quasi-Z-source simplified three-level inverter system by ½, and has obvious advantages.

Figure 6A:
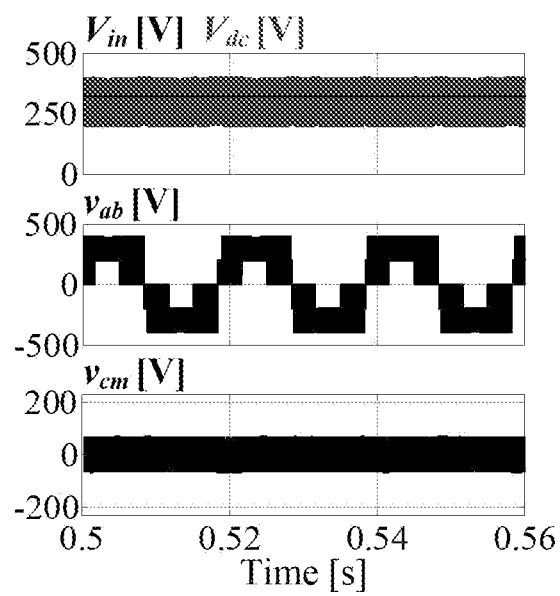
FIG. 6(a) and FIG. 6(b) are working waveform diagrams of the system under a boost operating mode using the method of the present invention, which include the DC input voltage ($V_{in}$), the quasi-Z-source network output voltage ($V_{dc}$), the line voltage ($v_{ab}$), the common-mode voltage ($v_{cm}$), the three-phase output currents ($i_a$, $i_b$, $i_c$), and the DC capacitor voltages ($V_{C1}$, $V_{C2}$, $V_{C3}$, $V_{C4}$).
Figure 6B:
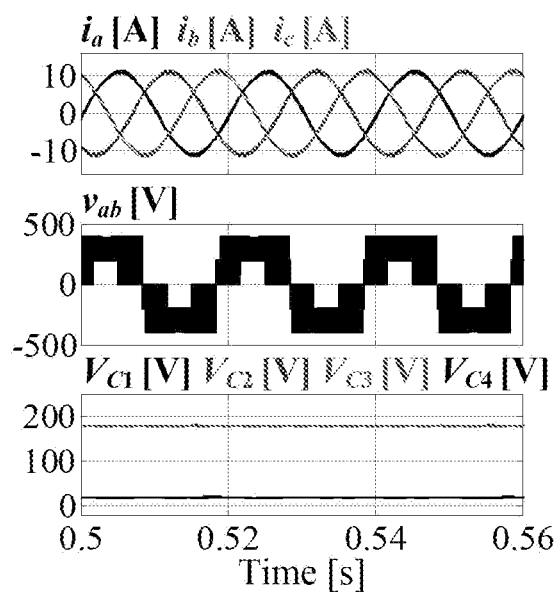

FIG. 6(a) and FIG. 6(b) are working waveform diagrams of the system under a voltage boosting operating mode using the method of the present invention, which include the DC input voltage ($V_{in}$), the quasi-Z-source network output voltage ($V_{dc}$), the line voltage ($v_{ab}$), the common-mode voltage ($v_{cm}$), the three-phase output currents ($i_a$, $i_b$, $i_c$), and the DC capacitor voltages ($V_{C1}$, $V_{C2}$, $V_{C3}$, $V_{C4}$). In this case, the DC input voltage is set to 320 V, and the degree of modulation and the shoot-through duty cycle are set to 0.8 and 0.1 respectively. It is evident that the magnitude of the output voltage of the quasi-Z-source network is 400 V and is higher than the DC input voltage, which verifies that the method of the present invention can realize the normal voltage boosting function of the system; the magnitude of the common-mode voltage is only ⅙ of the magnitude of the output voltage of the quasi-Z-source network, that is, 67 V; and the voltages at both ends of the capacitors $C_2$ and $C_3$ are equal, and the fluctuation is small, that is, the method of the present invention can effectively control the neutral-point voltage balance.

Figure 7A:
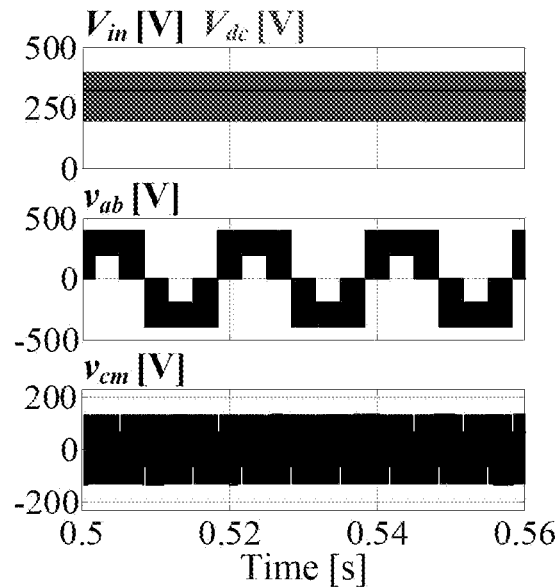
FIG. 7(a) and FIG. 7(b) are working waveform diagrams of the system under the boost operating mode using the traditional space vector modulation method, which include the DC input voltage ($V_{in}$), the quasi-Z-source network output voltage ($V_{dc}$), the line voltage ($v_{ab}$), the common-mode voltage ($v_{cm}$), the three-phase output currents ($i_a$, $i_b$, $i_c$), and the DC capacitor voltages ($V_{C1}$, $V_{C2}$, $V_{C3}$, $V_{C4}$).
Figure 7B:
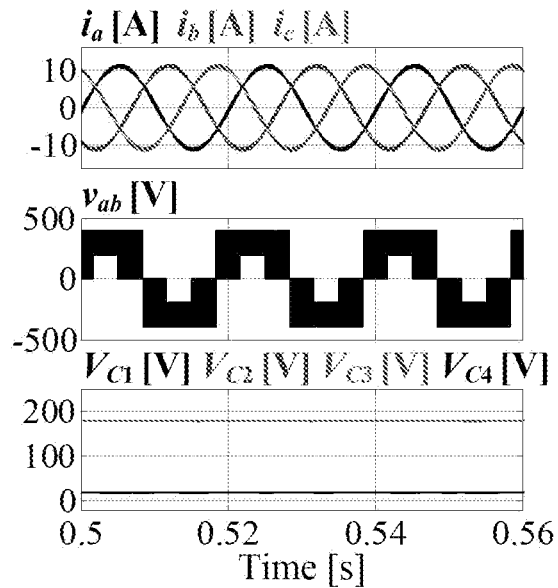

FIG. 7(a) and FIG. 7(b) are working waveform diagrams of the system under the voltage boosting operating mode using the traditional space vector modulation method, which include the DC input voltage ($V_{in}$), the quasi-Z-source network output voltage ($V_{dc}$), the line voltage ($v_{ab}$), the common-mode voltage ($v_{cm}$), the three-phase output currents ($i_a$, $i_b$, $i_c$), and the DC capacitor voltages ($V_{C1}$, $V_{C2}$, $V_{C3}$, $V_{C4}$). In this case, the DC input voltage is set to 320 V, and the degree of modulation and the shoot-through duty cycle are set to 0.8 and 0.1 respectively. Obviously, when the traditional space vector modulation method is adopted, the magnitude of the common-mode voltage of the system is as high as ⅓ of the magnitude of the output voltage of the quasi-Z-source network, that is, 133 V, which is twice the magnitude of the common-mode voltage when the method of the present invention is adopted.

Figure 8A:
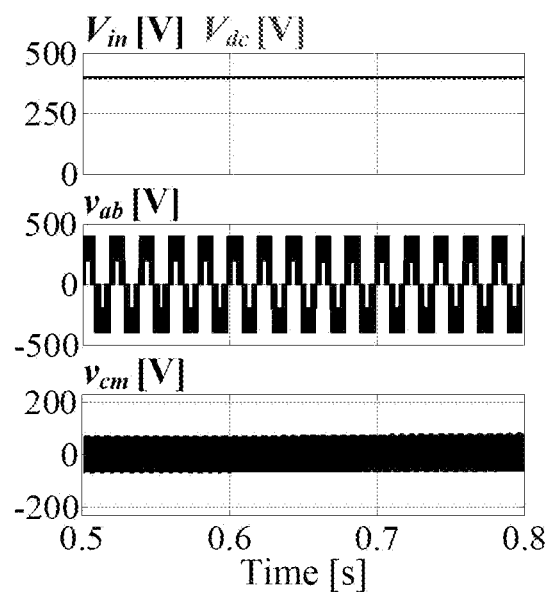
FIG. 8(a) and FIG. 8(b) are working waveform diagrams of the system under the non-voltage boosting operating mode using the method of the present invention when neutral-point voltage balance control changes from enable to cancel, which include the DC input voltage ($V_{in}$), the quasi-Z-source network output voltage ($V_{dc}$), the line voltage ($v_{ab}$), the common-mode voltage ($v_{cm}$), the three-phase output currents ($i_a$, $i_b$, $i_c$), and the DC capacitor voltages ($V_{C1}$, $V_{C2}$, $V_{C3}$, $V_{C4}$).
Figure 8B:
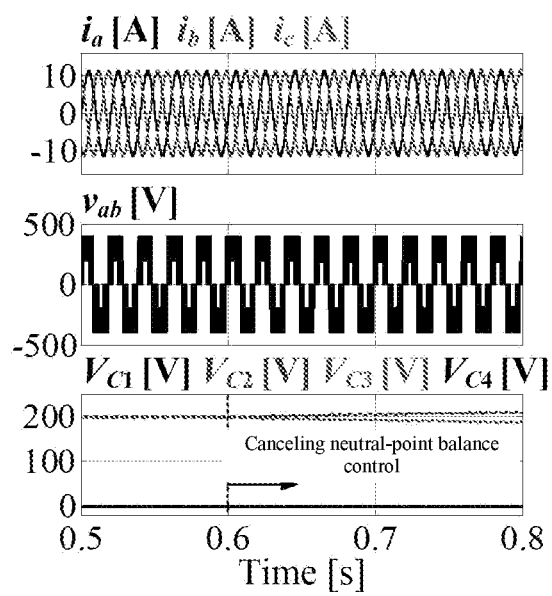

FIG. 8(a) and FIG. 8(b) are working waveform diagrams of the system under the non-voltage boosting operating mode using the method of the present invention when neutral-point voltage balance control changes from enable to cancel, which include the DC input voltage ($V_{in}$), the quasi-Z-source network output voltage ($V_{dc}$), the line voltage ($v_{ab}$), the common-mode voltage ($v_{cm}$), the three-phase output currents ($i_a$, $i_b$, $i_c$), and the DC capacitor voltages ($V_{C1}$, $V_{C2}$, $V_{C3}$, $V_{C4}$). In this case, the DC input voltage is set to 400 V, and the degree of modulation and the shoot-through duty cycle are set to 0.8 and 0 respectively. In order to verify the neutral-point voltage balance control function of the method of the present invention, resistors with 10 kΩ and 1 kΩ resistance values are connected in parallel at both ends of the capacitors $C_2$ and $C_3$, respectively. Before simulation time of 0.6 s, the neutral-point balance control function is enabled, it can be seen that: although the two ends of the capacitors $C_2$ and $C_3$ are connected in parallel with the resistors of different resistance values, the voltages at both ends of the two capacitors can still remain equal. After the simulation time of 0.6 s, the neutral-point balance control function is canceled, and the voltages at both ends of the two capacitors are offset, and a neutral-point voltage balance state cannot be maintained, thus indicating that the method of the present invention has an active control ability of the neutral-point voltage balance. Meanwhile, the neutral-point voltage balance control function does not affect the common-mode voltage suppression function.

Figure 9A:
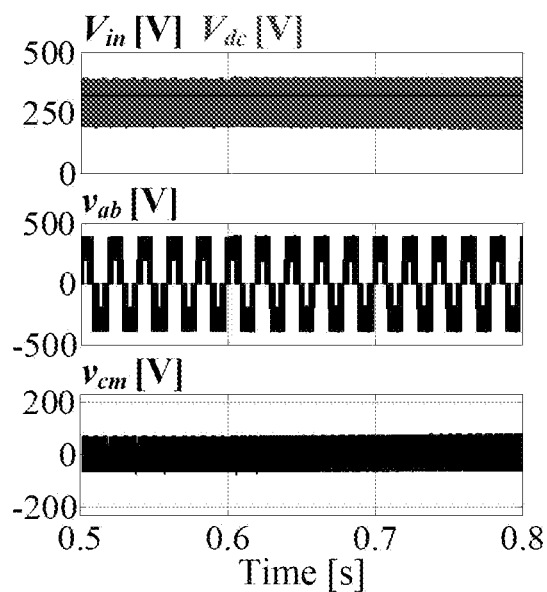
FIG. 9(a) and FIG. 9(b) are working waveform diagrams of a system under a voltage boosting operating mode using the method of the present invention when the neutral-point voltage balance control changes from enable to cancel, which include the DC input voltage ($V_{in}$), the quasi-Z-source network output voltage ($V_{dc}$), the line voltage ($v_{ab}$), the common-mode voltage ($v_{cm}$), the three-phase output currents ($i_a$, $i_b$, $i_c$), and the DC capacitor voltages ($V_{C1}$, $V_{C2}$, $V_{C3}$, $V_{C4}$).
Figure 9B:
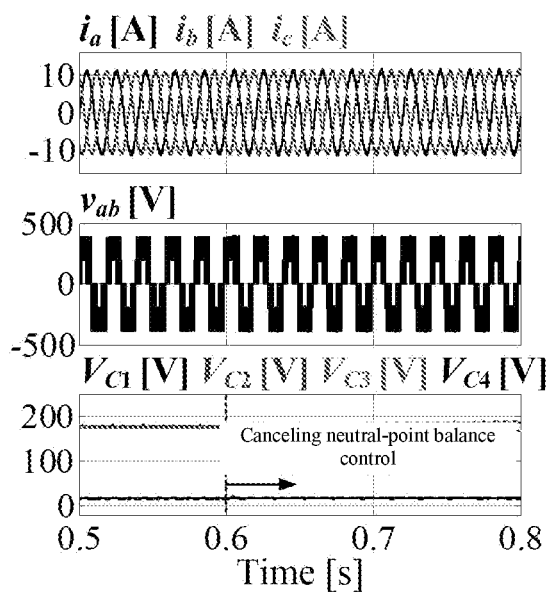

FIG. 9(a) and FIG. 9(b) are working waveform diagrams of a system under a voltage boosting operating mode using the method of the present invention when the neutral-point voltage balance control changes from enable to cancel, which include the DC input voltage ($V_{in}$), the quasi-Z-source network output voltage ($V_{dc}$), the line voltage ($v_{ab}$), the common-mode voltage ($v_{cm}$), the three-phase output currents ($i_a$, $i_b$, $i_c$), and the DC capacitor voltages ($V_{C1}$, $V_{C2}$, $V_{C3}$, $V_{C4}$). In this case, the DC input voltage is set to 320 V, and the degree of modulation and the shoot-through duty cycle are set to 0.8 and 0.1 respectively. In order to verify the neutral-point voltage balance control function of the method of the present invention, resistors with 10 kΩ and 1 kΩ resistance values are connected in parallel at both ends of the capacitors $C_2$ and $C_3$, respectively. It is evident that when the neutral-point balance control function is canceled, the voltages at both ends of the capacitors $C_2$ and $C_3$ are no longer equal, thus verifying the effectiveness of the neutral-point voltage balance control function of the method of the present invention.

Second Embodiment

This embodiment provides a common-mode voltage suppression system for a quasi-Z-source simplified three-level inverter.

A common-mode voltage suppression system for a quasi-Z-source simplified three-level inverter, comprising:
  a sector judgment module configured to judge a sector where a reference voltage vector is located according to a magnitude and a phase angle of the reference voltage vector;
  a basic voltage vector selecting module configured to select two large vectors and two small vectors with low common-mode voltage magnitudes as basic voltage vectors according to the sector where the reference voltage vector is located;
  a basic voltage vector duty cycle and small vector duty cycle distribution factor calculation module configured to write a volt-second balance equation according to the selected basic voltage vectors, and calculate, in combination with an introduced distribution factor of duty cycles of small vectors, initial values of distribution factors of a duty cycle of each basic voltage vector and duty cycles of small vectors;

a neutral-point voltage balance controller module configured to design a neutral-point voltage balance controller so as to obtain a corrected value of the distribution factor of the duty cycles of the small vectors; and a small vector duty cycle distribution factor update module configured to utilize the corrected value of the distribution factor of the duty cycles of the small vectors and the initial values and combine with a set neutral-point voltage balance control threshold to update the distribution factor of duty cycles of the small vectors so as to update the duty cycle of each basic voltage vector; and a shoot-through state insertion and switching sequence design module configured to insert shoot-through states into the small vectors, design a corresponding switching sequence, convert the switching sequence into a driving signal of a power switch, and control an operation of the quasi-Z-source simplified three-level inverter.

It should be noted herein that the above sector judgment module, basic voltage vector selection module, basic voltage vector duty cycle and small vector duty cycle distribution factor calculation module, neutral-point voltage balance controller module, small vector duty cycle distribution factor update module and shoot-through state insertion and switching sequence design module are the same as the examples and application scenarios realized by the steps in the first embodiment, but are not limited to the contents disclosed in the first embodiment. It should be noted that the above modules as part of the system can be executed in a computer system such as a set of computer executable instructions.

Embodiment 3

This embodiment provides a computer-readable storage medium on which a computer program is stored that, when executed by a processor, implements the steps in the common-mode voltage suppression method of the quasi-Z-source simplified three-level inverter as described in the first embodiment.

Embodiment 4

This embodiment provides a computer device comprising a memory, a processor and a computer program stored in the memory and is capable of being run on the processor, wherein the processor executes the program to implement the steps in the common-mode voltage suppression method of the quasi-Z-source simplified three-level inverter as described in the first embodiment.

Those skilled in the art should understand that the embodiment of the invention can provide method, system or computer program products. Therefore, the present invention may take a form of hardware embodiments, software embodiments, or embodiments combining software and hardware aspects. Furthermore, the present invention may take a form of a computer program product implemented on one or more computer available storage media (including but not limited to a disk memory and an optical memory, etc.) which contain computer available program codes.

The present invention is described with reference to the flow diagram and/or the block diagram of the method, device (system) and computer program product according to the embodiments of the present invention. It should be understood that each flow and/or block in the flow diagram and/or the block diagram and combination of flow and/or block in the flow diagram and/or the block diagram can be implemented by computer program commands. These computer program commands can be provided to processors of a universal computer, a dedicated computer, an embedded processor or other programmable data processing devices to generate a machine, so that commands executed by the processors of the computer or other programmable data processing devices generate a device for implementing appointed functions in one or more flows in the flow diagram and/or one or more blocks in the block diagram.

These computer program commands can be further stored a computer readable memory capable of guiding the computer or other programmable data processing devices to work in a special mode, so that the commands stored in the computer readable memory generate a manufactured product including the command device, and the command device implements appointed functions in one or more flows in the flow diagram and/or one or more blocks in the block diagram.

These computer program commands can be further loaded to the computer or other programmable data processing devices, so that a series of operating steps are executed on the computer or other programmable data processing devices to generate processing implemented by the computer, and therefore, the commands executed on the computer or other programmable data processing devices provide a step of implementing appointed functions in one or more flows in the flow diagram and/or one or more blocks in the block diagram.

It will be understood by a person skilled in the art that the implementation of all or part of the processes of the methods of the embodiments described above can be accomplished by instructing a relevant hardware by a computer program, which may be stored on a computer readable storage medium, and which, when being executed, may include the processes of the embodiments of the methods described above. The storage medium may be a disk, optical disc, Read-Only Memory (ROM) or Random Access Memory (RAM) etc.

The foregoing is merely illustrative of the preferred embodiments of the present invention and is not intended to be limiting of the present invention, and for those skilled in the art, the present invention may have various changes and modifications. Any modifications, equivalent substitutions, improvements, and the like within the spirit and principles of the invention are intended to be included within the scope of the present invention.

The invention claimed is:

1. A common-mode voltage suppression method for a quasi-Z-source simplified three-level inverter, comprising:
   judging a sector where a reference voltage vector is located according to a magnitude and a phase angle of the reference voltage vector;
   selecting two large vectors and two small vectors with low common-mode voltage magnitudes as basic voltage vectors according to the sector where the reference voltage vector is located;
   writing a volt-second balance equation according to the selected basic voltage vectors, and calculating, in combination with an introduced distribution factor of duty cycles of small vectors, initial values of distribution factors of a duty cycle of each basic voltage vector and duty cycles of small vectors;

designing a neutral-point voltage balance controller so as to obtain a corrected value of the distribution factor of the duty cycles of the small vectors; and utilizing the corrected value of the distribution factor of the duty cycles of the small vectors and the initial values and combining with a set neutral-point voltage balance control threshold to update the distribution factor of duty cycles of the small vectors so as to update the duty cycle of each basic voltage vector; and inserting shoot-through states into the small vectors, designing a corresponding switching sequence, converting the switching sequence into a driving signal of a power switch, and controlling an operation of the quasi-Z-source simplified three-level inverter;

wherein a process of calculating an initial value of a distribution factor of the duty cycles of the small vectors comprises:

calculating a minimum and maximum values of the distribution factor of the duty cycles of the small vectors according to a degree of modulation, the phase angle of the reference voltage vector and a shoot-through duty cycle; and when the reference voltage vector is located in sector 1, the minimum and maximum values of the distribution factor of the duty cycles of the small vectors are respectively:

$$\varphi_{min} = \max\left\{0, \frac{d_{ST}}{2-2m\cdot\sin\left(\frac{\pi}{3}+\theta\right)}, \frac{1-\sqrt{3}\cdot m\cdot\sin\left(\frac{\pi}{6}+\theta\right)}{1-m\cdot\sin\left(\frac{\pi}{3}+\theta\right)}\right\}$$

$$\varphi_{max} = \min\left\{1, 1-\frac{d_{ST}}{2-2m\cdot\sin\left(\frac{\pi}{3}+\theta\right)}, \frac{m\cdot\sin\left(\frac{\pi}{3}-\theta\right)}{1-m\cdot\sin\left(\frac{\pi}{3}+\theta\right)}\right\}$$

wherein m, θ, and $d_{ST}$ are the degree of modulation, the phase angle of the reference voltage vector and the shoot-through duty cycle, respectively; and obtaining the initial value of the distribution factor of the duty cycles of the small vectors according to duty cycles of the two large vectors according to an arithmetic mean value of the minimum value and the maximum value of the distribution factor of the duty cycles of small vectors.

2. The common-mode voltage suppression method for a quasi-Z-source simplified three-level inverter according to claim 1, wherein the basic voltage vectors with low common-mode voltage magnitudes are selected, which includes: six large vectors, six small vectors with low common-mode voltage magnitudes, one zero vector with a low common-mode voltage magnitude, and six shoot-through vectors.

3. The common-mode voltage suppression method for a quasi-Z-source simplified three-level inverter according to claim 1, wherein calculating a duty cycle of each basic voltage vector specifically comprises:

substituting expressions of the two large vectors, expressions of the two small vectors and the phase angle of the reference voltage vector to the volt-second balance equation to get a sum of the duty cycles of the two small vectors, and introducing a distribution factor of the duty cycles of the small vectors to obtain the duty cycles of the two small vectors;

obtaining duty cycles of the two large vectors according to the distribution factor of duty cycles of the small vectors; and obtaining the duty cycle of each basic voltage vector.

4. The common-mode voltage suppression method for a quasi-Z-source simplified three-level inverter according to claim 1, wherein designing a neutral-point voltage balance controller so as to obtain a corrected value of the distribution factor of the duty cycles of the small vectors specifically comprises:

sampling voltages at both ends of capacitors $C_2$ and $C_3$ in a quasi-Z-source network to calculate a deviation of the voltages of the two capacitors and sending the deviation to a PI regulator, and taking an absolute value of an output of the PI regulator to calculate a corrected value $y_{np}$ of the distribution factor of the duty cycles of the small vectors, that is $$y_{np} = \left|\left(k_{p,np} + \frac{k_{i,np}}{s}\right)\cdot(V_{C2} - V_{C3})\right|$$

$V_{C2}$ and $V_{C3}$ are the voltages at both ends of the capacitors $C_2$ and $C_3$ respectively, $k_{p,np}$ and $k_{i,np}$ are parameters of the PI regulator.

5. The common-mode voltage suppression method for a quasi-Z-source simplified three-level inverter according to claim 1, wherein the process of updating the distribution factor of duty cycles of the small vectors comprises: setting a neutral-point voltage balance control threshold $\Delta Vnp\_th$ according to requirements of the neutral-point voltage balance control of the system; and updating, according to the voltage deviation of the sector where the reference voltage vector is located and the voltages of capacitors C2 and C3, the distribution factor of the duty cycles of the small vectors by using the corrected value of the distribution factor of the duty cycles of the small vectors;

when $-\Delta V_{np\_th} < V_{C2} - V_{C3} < \Delta V_{np\_th}$, maintaining the distribution factor of duty cycles of small vectors unchanged at its initial value, i.e., $\varphi = \varphi_0$ when the reference voltage vector is located in sector 1, sector 3, or sector 5, and $V_{C2} - V_{C3} > \Delta V_{np\_th}$, updating the distribution factor of duty cycles of small vectors as follows $$\varphi = \varphi_0 + y_{np}$$

when the reference voltage vector is located in sector 1, sector 3, or sector 5, and $V_{C2} - V_{C3} < -\Delta V_{np\_th}$, updating the distribution factor of duty cycles of small vectors as follows $$\varphi = \varphi_0 - y_{np}$$

when the reference voltage vector is located in sector 2, sector 4, or sector 6, and $V_{C2} - V_{C3} > \Delta V_{np\_th}$, updating the distribution factor of duty cycles of small vectors as follows $$\varphi = \varphi_0 - y_{np}$$

when the reference voltage vector is located in sector 2, sector 4, or sector 6, and $V_{C2}-V_{C3} < -\Delta V_{np\_th}$, updating the distribution factor of duty cycles of small vectors as follows $$\varphi = \varphi_0 + y_{np}.$$

6. The common-mode voltage suppression method for a quasi-Z-source simplified three-level inverter according to claim 1, wherein inserting shoot-through states into the small vectors, and designing a corresponding switching sequence specifically comprises: inserting a down-shoot-through state into P-type small vectors and inserting an up-shoot-through state into N-type small vectors;

when the reference voltage vector is in sector 1, designing the switching sequence as:
PNN-UUN-OON-PPN-PDD-POO-PDD-PPN-OON-UUN-PNN;
when the reference voltage vector is in sector 2, designing the switching sequence as:
PPN-DPD-OPO-NPN-UUN-OON-UUN-NPN-OPO-DPD-PPN;
when the reference voltage vector is in sector 3, designing the switching sequence as:
NPN-NUU-NOO-NPP-DPD-OPO-DPD-NPP-NOO-NUU-NPN;
when the reference voltage vector is in sector 4, designing the switching sequence as:
NPP-DDP-OOP-NNP-NUU-NOO-NUU-NNP-OOP-DDP-NPP;
when the reference voltage vector is in sector 5, designing the switching sequence as:
NNP-UNU-ONO-PNP-DDP-OOP-DDP-PNP-ONO-UNU-NNP;
when the reference voltage vector is in sector 6, designing the switching sequence as:
PNP-PDD-POO-PNN-UNU-ONO-UNU-PNN-POO-PDD-PNP.

7. A computer-readable storage medium on which a computer program is stored that, when executed by a processor, implements the steps in the common-mode voltage suppression method for a quasi-Z-source simplified three-level inverter according to claim 1.

8. A computer device comprising a memory, a processor and a computer program stored in the memory and is capable of being run on the processor, wherein the processor executes the program to implement the steps in the common-mode voltage suppression method for a quasi-Z-source simplified three-level inverter according to claim 1.

\* \* \* \* \*